(12) United States Patent
Freedman

(10) Patent No.: US 7,301,910 B2
(45) Date of Patent: Nov. 27, 2007

(54) METHODS AND SYSTEMS FOR AUTOMATED ANALYSIS OF SIGNALING LINK UTILIZATION

(75) Inventor: Steven Michael Freedman, Raleigh, NC (US)

(73) Assignee: Tekelec, Morrisville, NC (US)

( * ) Notice: Subject to any disclaimer, the term of this patent is extended or adjusted under 35 U.S.C. 154(b) by 0 days.

(21) Appl. No.: 10/702,365

(22) Filed: Nov. 6, 2003

(65) Prior Publication Data

US 2005/0099958 A1    May 12, 2005

(51) Int. Cl.
*H04L 12/26* (2006.01)
*H04M 7/00* (2006.01)
*G06F 3/033* (2006.01)

(52) U.S. Cl. ............... 370/252; 370/522; 379/219; 345/157

(58) Field of Classification Search ............... 370/252; 379/1.01, 2, 9, 10, 12, 14, 15, 29.01, 132.01, 379/133, 134, 136
See application file for complete search history.

(56) References Cited

U.S. PATENT DOCUMENTS

| | | | | |
|---|---|---|---|---|
| 5,475,732 A | * | 12/1995 | Pester, III | 379/32.01 |
| 5,850,386 A | * | 12/1998 | Anderson et al. | 370/241 |
| 5,867,558 A | * | 2/1999 | Swanson | 379/9.03 |
| 6,282,267 B1 | * | 8/2001 | Nolting | 379/32.03 |
| 6,327,350 B1 | * | 12/2001 | Spangler et al. | 379/115.01 |
| 6,356,256 B1 | * | 3/2002 | Leftwich | 345/157 |
| 2002/0118813 A1 | * | 8/2002 | Brehm et al. | 379/229 |
| 2003/0105850 A1 | | 6/2003 | Lean et al. | |

* cited by examiner

*Primary Examiner*—Steven Nguyen
(74) *Attorney, Agent, or Firm*—Jenkins, Wilson, Taylor & Hunt, P.A.

(57) ABSTRACT

Methods and systems for automated analysis of signaling link utilization are disclosed. A method for automatically analyzing signaling link utilization includes displaying signaling link utilization data to a user via a computer display device. User input regarding a portion of the link utilization data that the user desires to analyze is received. Signaling message data corresponding to the selected link utilization data is automatically extracted from a database. The signaling message data may be used to determine the cause of signaling link utilization problems.

26 Claims, 5 Drawing Sheets
(1 of 5 Drawing Sheet(s) Filed in Color)

FIG. 4

METHODS AND SYSTEMS FOR AUTOMATED ANALYSIS OF SIGNALING LINK UTILIZATION

TECHNICAL FIELD

The present invention relates to methods and systems for analyzing signaling link utilization. More particularly, the present invention relates to methods and systems for automated analysis of signaling link utilization.

BACKGROUND ART

In telecommunications networks, signaling links carry signaling messages between signaling nodes. In modern telecommunications networks, the signaling links are separate from the media trunks used to carry media communications between end users. The signaling messages that traverse the signaling links include messages used to set up and tear down calls, database queries and responses, and network management messages.

Due to the vital function performed by signaling links in telecommunications networks, it is desirable to ensure that signaling links are available at all times to send and receive signaling message traffic. For example, a DSO link is capable of carrying data at 56 kilobits per second. 56 kilobits per second translates into 7,000 bytes per second. In order to ensure that a signaling link does not become congested, networks are typically engineered such that signaling links are 40% loaded. Using the DSO link as an example, this means that a DSO link is typically engineered to carry 40% of 7000 or 2800 bytes per second. Assuming an average message size of 40 bytes, a DSO signaling link engineered for 40% capacity can carry 70 messages per second.

While engineering signaling links for 40% or other capacity is a good practice, sudden bursts of signaling messages or network management messages may cause a link to become congested and temporarily unavailable to carry signaling message traffic. Since such a situation is undesirable, service providers use network monitoring systems to analyze signaling link utilization and determine causes of over-utilization of signaling links.

One problem with conventional network monitoring systems is that analyzing signaling link utilization requires a user to identify a signaling link that has become congested and to manually search through signaling message data to determine the cause of the signaling link congestion. For example, link utilization applications typically display link utilization information for a plurality of different signaling links on a single display screen. In order to diagnose a signaling link utilization problem, a user must manually identify the signaling link that caused the problem and the time period over which the problem occurred from the link utilization application. The user must then terminate the link utilization application and execute a protocol analysis application. Using the protocol analysis application, the user must input the parameters associated with the signaling link of interest and the time period and extract the corresponding messages from a signaling message database. Such a manual link utilization diagnosis process is labor-intensive and subject to user errors.

Accordingly, there exists a need for improved methods and systems for automated analysis of signaling link utilization.

DISCLOSURE OF INVENTION

The present invention includes methods and systems for automated analysis of signaling link utilization. According to one exemplary method, signaling messages are copied from a plurality of different signaling links and stored in a database. Link utilization data is derived from the data in the database and displayed to a user in graphical format via a computer display device. The user analyzes the graphical data and selects, using a user input device, a portion of the link utilization data that the user desires to analyze. Based on the portion of the link utilization data selected by the user, signaling message data corresponding to the selected portion is automatically extracted from the message database. In one implementation, the user can launch a protocol analysis application from a link utilization screen simply by clicking on the link utilization data of interest using a mouse. The signaling message data is then displayed to the user. The user can use the signaling message data to determine the cause of the signaling link utilization problem. Thus, signaling link utilization and protocol analysis functions are combined. Because the signaling message data corresponding to the point selected by the user in the link utilization data is automatically extracted from the database and displayed to the user, the time required for analyzing link utilization problems is greatly reduced over conventional manual methods.

Accordingly, it is an object of the invention to provide methods and systems for automated analysis of signaling link utilization.

It is another object of the invention to provide a convenient graphical user interface for a user to automatically analyze signaling link utilization data.

It is yet another object of the invention to combine signaling link utilization functions with protocol analysis functions in a network monitoring system.

BRIEF DESCRIPTION OF THE DRAWINGS

"The patent or application file contains at least one drawing executed in color. Copies of this patent with color drawing(s) will be provided by the Patent and Trademark Office upon request and payment of necessary fee."

Preferred embodiments of the invention will now be described with reference to the accompanying drawings of which:

FIG. 4 is a computer screen shot illustrating exemplary message data that may be displayed to a user based on selected signaling link utilization data selected by the user according to an embodiment of the present invention.

DETAILED DESCRIPTION OF THE INVENTION

Figure 1:
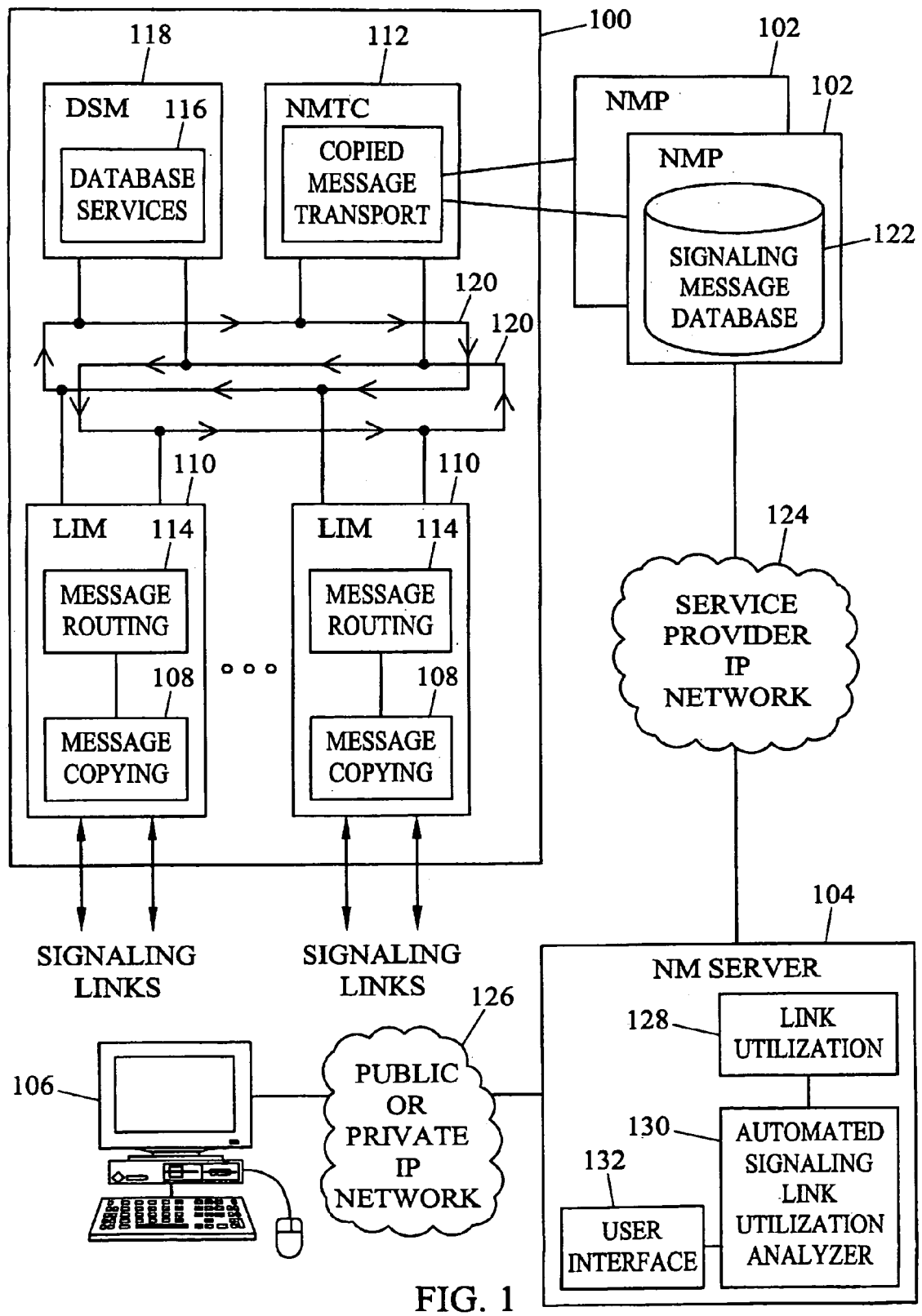
FIG. 1 is a block diagram of a network monitoring system including an automated signaling link utilization analyzer according to an embodiment of the present invention.

FIG. 1 is a block diagram illustrating a network monitoring system including an automated signaling link utilization analyzer according to an embodiment of the present invention. Referring to FIG. 1, the network monitoring system may include components internal to a signaling message routing node, such as STP 100, and external components 102, 104, and 106 that process and analyze signaling messages copied from STP 100.

In the illustrated example, the internal components include message copy functions 108 located on link interface modules 110 and a network monitoring transport card 112. Message copy functions 108 copy signaling messages sent and received over external signaling links. Network monitoring transport card 112 transports messages copied by message copy functions 108 to external network monitoring processors 102.

In addition to network monitoring components, STP 100 includes message routing functions 114 resident on link interface modules 110 and database service functions 116 resident on a database services module 118. Message routing functions 114 route or transfer signaling messages between signaling links. For example, message routing functions 114 may implement MTP level 3 routing for SS7 signaling messages or IP routing for IP signaling messages. Database service functions 116 may perform database-related services for received signaling messages, such as global title translation and number portability lookups.

From a hardware perspective, each of the modules in STP 100 may include a printed circuit board including an application processor and a communications processor mounted thereon. The applications processor may perform signaling message processing functions, such as routing and message copying. The communications processor may control communications between processing modules over a pair of counter rotating, dual ring buses 120.

The external components of the network monitoring system illustrated in FIG. 1 include network monitoring processors 102, network monitoring server 104, and user terminal 106. Network monitoring processors 102 receive signaling messages copied by message copy functions 108 and store the signaling messages in a signaling message database 122. Network monitoring processors 102 may be connected to network monitoring server 104 by any suitable type of network, such as a service provider's internal IP network 124. Similarly, user interface 106 may be connected to network monitoring server 104 by a public or private IP network 126. In one example, network monitoring server 104 may include a web server, user terminal 106 may include a web client, and network 126 may be the public Internet.

The signaling messages for multiple signaling links may be intermixed in database 122, making analysis using manual methods difficult. In order to avoid this difficulty, network monitoring server 104 includes a link utilization application 128, an automated link utilization analyzer 130, and a user interface 132. Link utilization application 128 analyzes signaling link utilization based on messages stored in database 122 and displays the signaling link utilization to a user in a convenient format, such as a graphical format. The graphical format may include link utilization data for many different signaling links. The user may select a portion of the graph that corresponds to a spike or instance of comparatively high link utilization. Automated link utilization analyzer 130 automatically extracts signaling message data from signaling message database 122 corresponding to the selected link utilization data and displays the signaling message data for the user. In one implementation, automated link utilization analyzer 130 may include a protocol analysis application that can be launched from a link utilization screen displayed by link utilization application 128 in response to the selection by the user. User interface 132 displays the signaling message data to the user via a convenient interface, such as web browser. Because the user can automatically launch a protocol analysis application from a link utilization screen and view the signaling messages that cause link utilization problems, the time required to diagnose utilization problems is decreased over that of conventional manual methods.

Figure 2:
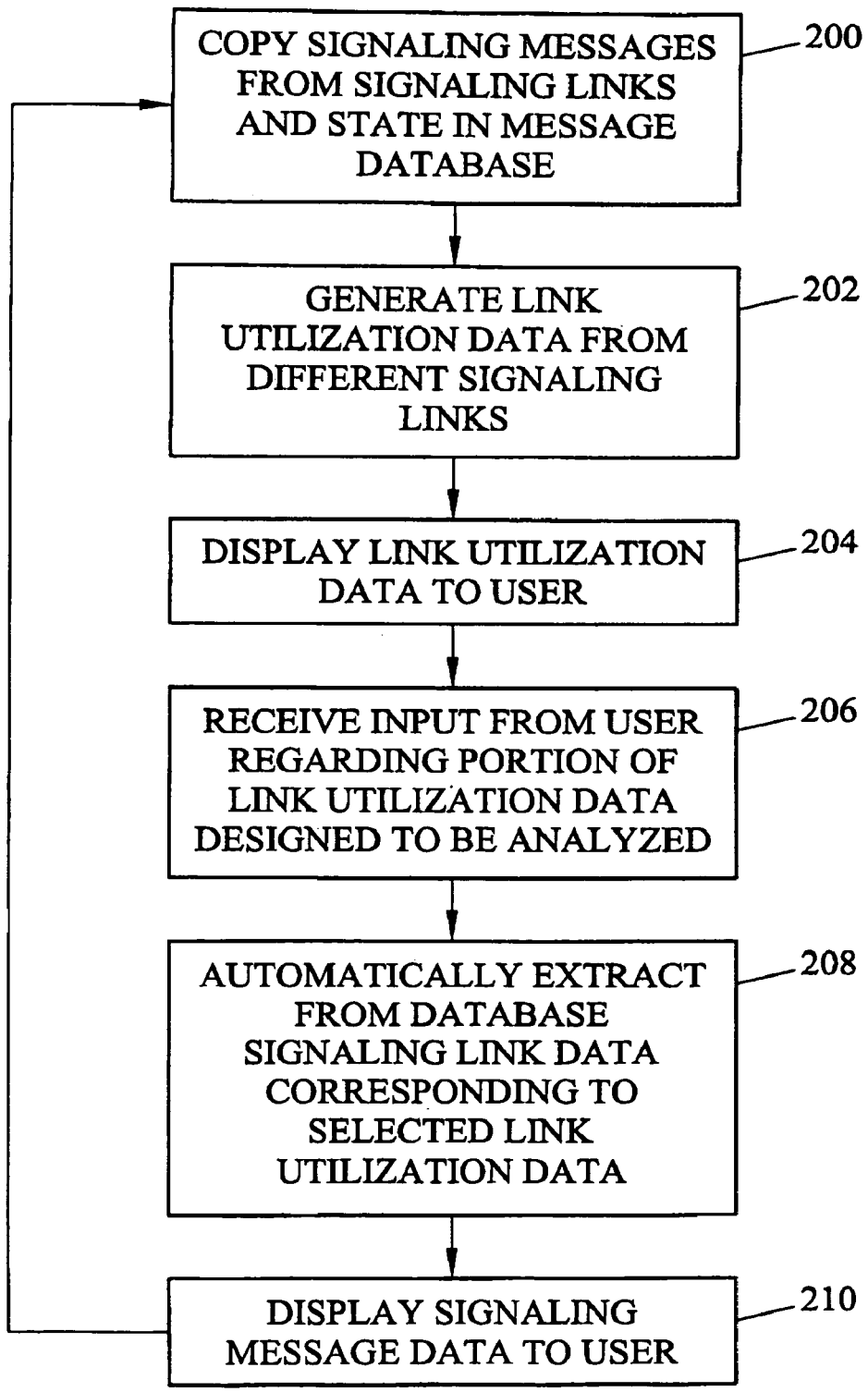
FIG. 2 is a flow chart illustrating exemplary steps for performing automated signaling link utilization analysis according to an embodiment of the present invention.

FIG. 2 is a flow chart illustrating exemplary steps for automated signaling link utilization analysis according to an embodiment of the present invention. Referring to FIG. 2, in step 200, signaling messages are copied from signaling links and stored in a database. In FIG. 1, this function is performed by message copy functions 108. In one exemplary implementation, message copy functions 108 broadcast network monitoring service request via UDP to network monitoring processors 102. Each network monitoring processor 102 may be preconfigured to service a particular message copy function 108 or group of message copy functions 108. Accordingly, the network monitoring processor provisioned to service a particular message copy function 108 responds to the broadcast service request with a service acceptance. A TCP/IP connection is then established between the message copy function 108 and one of the network monitoring processors 102 via network monitoring transport card 112. Copied messages are then sent over the TCP/IP connection and stored in signaling message database 122.

In step 202, link utilization data is generated for different signaling links. This function may be performed by link utilization application 128 on network monitoring server 104 based on messages stored in database 122. For example, link utilization application 128 may count the number of signaling messages received per unit time for each signaling link being monitored. The signaling link may be identified by one or more parameters in the signaling message, such as the originating point code (OPC), destination point code (DPC) and circuit identifier code (CIC), or by a link identifier that a message copy function 108 associates with the signaling message.

In one exemplary implementation, message copy functions 108 may encapsulate each copied signaling message in a network monitoring packet that indicates the type and origin of a particular message. One type of packet that may be used is a link data packet. A link data packet includes a header that identifies the card and port on which a particular message was received. The card and port identifiers in the link data message may be used by link utilization analyzer 128 to count messages that traverse a particular signaling link. Exemplary network monitoring packet formats suitable for use with embodiments of the present invention are described in commonly assigned, co-pending U.S. patent application Ser. No. 10/154,309, filed May 23, 2002, the disclosure of which is incorporated herein by reference in its entirety.

Figure 3:
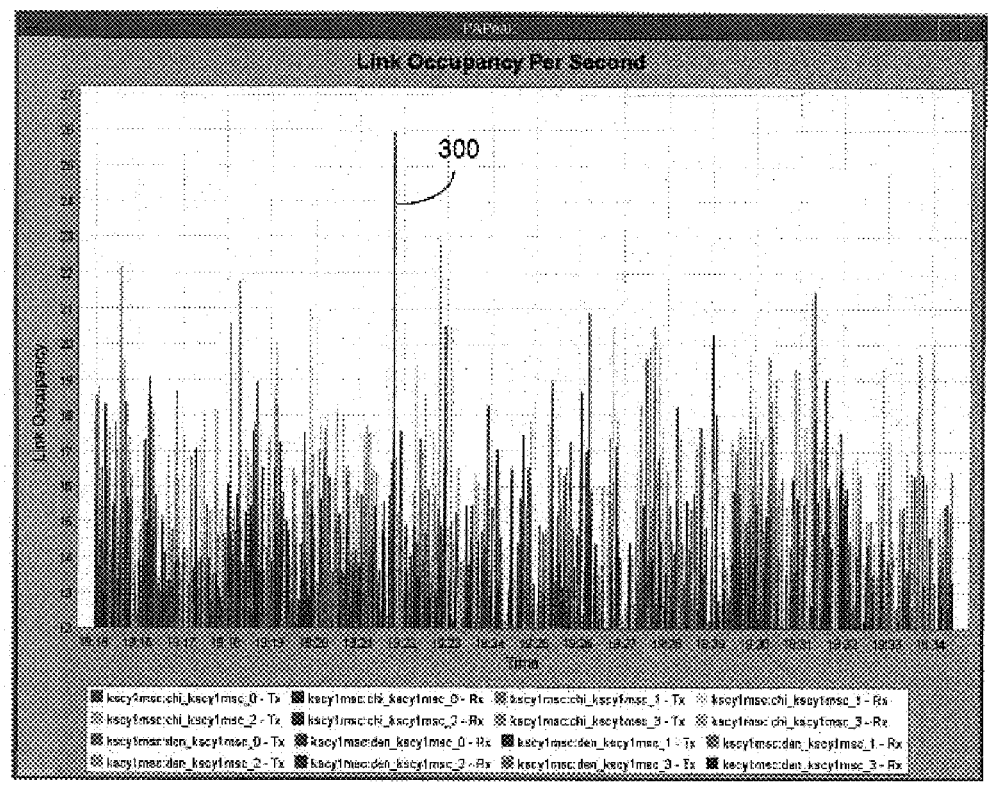
FIG. 3 is a computer screen shot of signaling link utilization data that may be displayed to a user by an automated signaling link utilization analyzer according to an embodiment of the present invention.

In step 204, signaling link utilization data is displayed to a user. The signaling link utilization data may be displayed to the user in any convenient format, such as graphical format or tabular format. FIG. 3 illustrates an example of signaling link utilization data that is displayed to a user in graphical format. In FIG. 3, the ordinate axis represents time and the abscissa axis represents link occupancy per unit time. Each color represented in the graph represents utilization of a different signaling link. As illustrated in FIG. 3, signaling data for a plurality of different signaling links may be displayed to the user. However, using conventional network monitoring systems, the user will be required to manually extract signaling message data for link occupancy data of interest to the user. Using a conventional network monitoring system, this step would be performed by the user identifying data of interest from the link utilization graph, manually identifying the signaling link, manually launching a protocol analysis application, and manually inputting parameters to extract data for the link of interest. Such a process is time consuming and error prone.

The present invention automates signaling link utilization analysis by allowing the user to automatically launch a protocol analysis application from the link utilization screen. In one implementation, the user is allowed to select link occupancy data from the display of link occupancy data and automatically receive the corresponding signaling message data. Accordingly, in step 204, input from the user is received regarding a portion of the link utilization data desired to be analyzed. In the example illustrated in FIG. 3, the user may select spike 300 using a user input device, such as a keyboard or mouse, because spike 300 includes the highest point of link occupancy data in the graph. In step 208, signaling message data corresponding to the selected link occupancy or utilization data is extracted from message database 122. In order to extract the correct information, automated link utilization analyzer 130 may identify the data that the user selected. This step may be performed by selecting the point on the graph closest to the point on which the user clicked. Once the point is identified, the corresponding signaling link and time period are identified. The signaling link and time period may then be used as a filter for filtering signaling messages in database 122.

Figure 4:
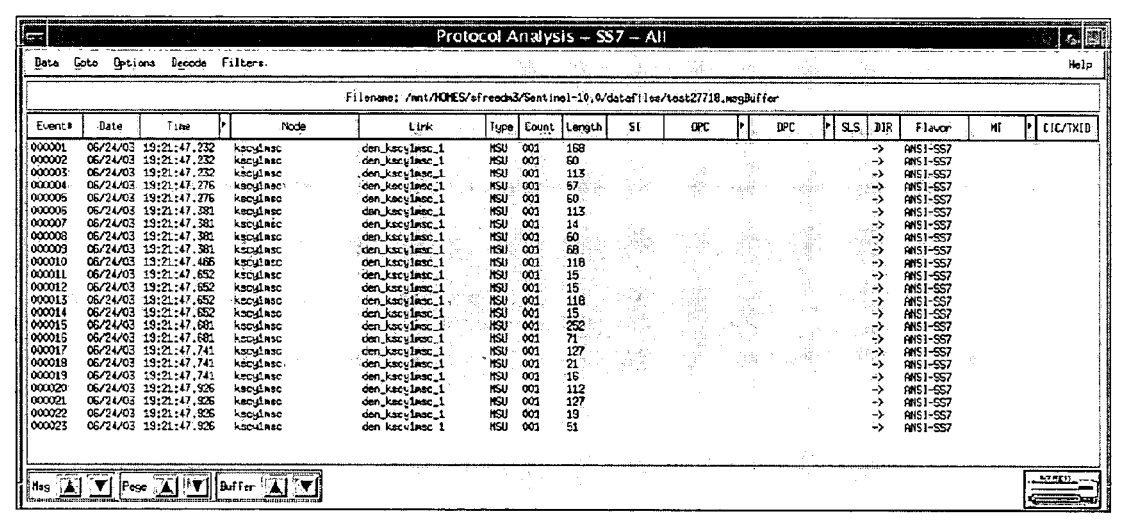

Returning to FIG. 2, in step 210, the signaling messages data is displayed to the user. FIG. 4 illustrates an example of signaling message data that may be displayed to the user. In FIG. 4, the signaling message data includes the date on which a signaling message was sent, the time, the sending node, the link ID, the type of signaling message, the count, the length, and other information regarding the signaling message. Using this information, the user can diagnose the cause of signaling link utilization problems. For example, if all signaling messages on an over-utilized link are from a short message service center, the spike in signaling link utilization may be caused by spam SMS messages. In another example, if all of the signaling messages are directed to an 800 number database for determining the directory number corresponding to an 800 number for a radio station, a radio station call-in contest may be determined to be the cause of the signaling link over-utilization. By displaying the signaling messages corresponding to the signaling link utilization data in a convenient format, the present invention greatly reduces the time required to diagnose signaling link utilization problems over the time required using conventional network monitoring systems.

The present invention is not limited to displaying the signaling message data illustrated in FIG. 4. Any suitable data that may be extracted from or derived from signaling messages on a particular signaling link is intended to be within the scope of the invention. For example, automated signaling link utilization analyzer 126 may display the TCAP, MAP, or other application level message type so that the application that caused the link utilization problem can be identified. In addition, for IP telephony signaling messages, automated signaling link utilization analyzer 130 may display the signaling message type for similar diagnostic purposes.

Figure 5:
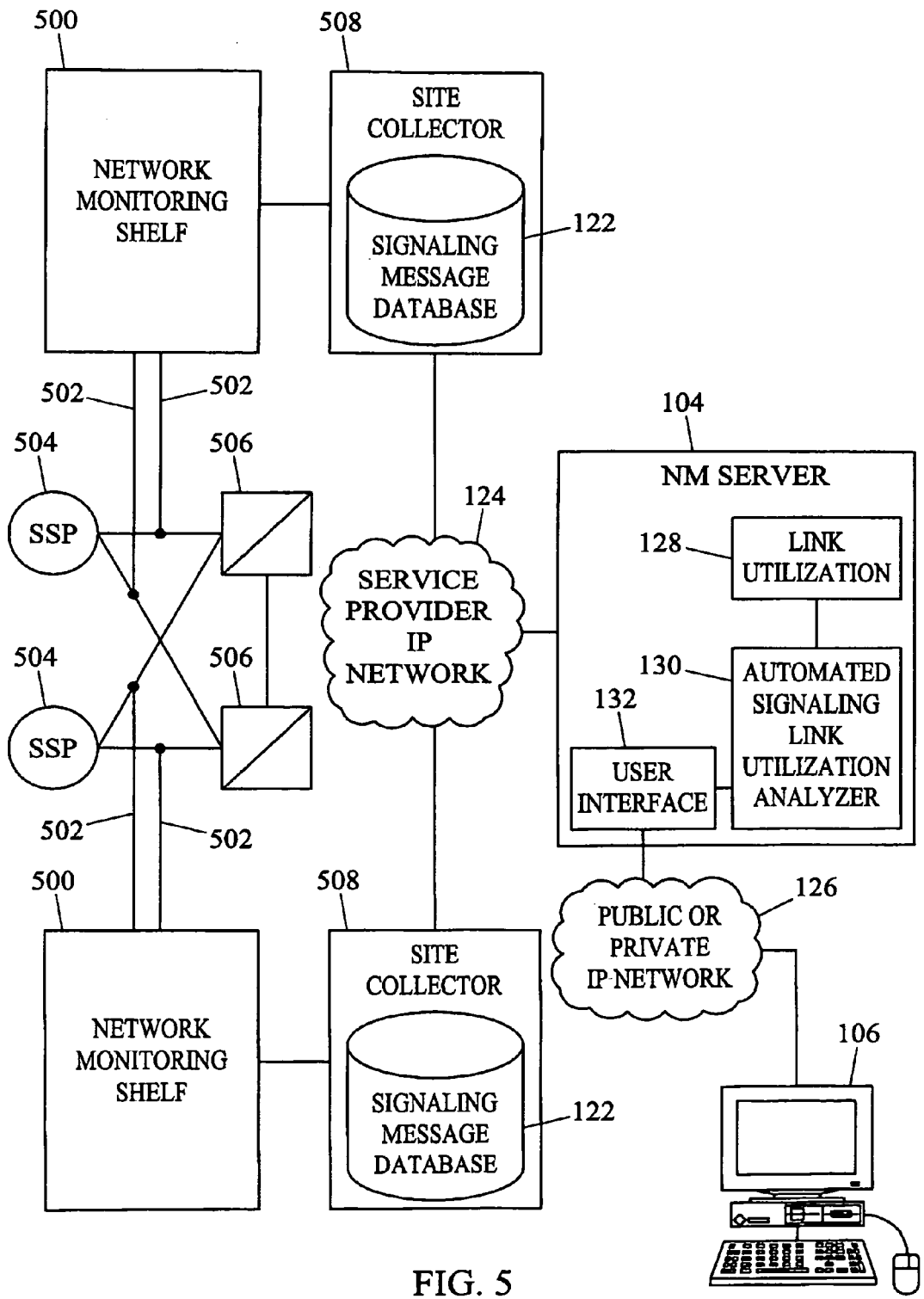
FIG. 5 is a block diagram illustrating an alternate implementation of a network monitoring system including an automated signaling link utilization analyzer according to an embodiment of the present invention.

Although in the embodiment illustrated in FIG. 1 the automated signaling link utilization analyzer 130 was used with a network monitoring system that was partially implemented using components within a network routing node, the present invention is not limited to such an embodiment. FIG. 5 illustrates an alternate implementation of a network monitoring system with which automated signaling link utilization analysis of the present invention may be used. Referring to FIG. 5, a network monitoring system includes network monitoring shelves 500 and signaling link probes 502 for copying signaling messages on access links between service switching points 504 and signaling transfer points 506. Network monitoring shelves may include link interface modules for copying the signaling messages and link interface cards for processing the signaling messages. Examples of network monitoring shelves 500 include the i2000 and i3000 shelves available from Tekelec of Calabasas, Calif.

The network monitoring system also includes site collectors 508 for received signaling messages copied from the signaling links and storing the signaling messages copies in signaling message database 122. Site collectors 508 may be implemented using a general purpose computing platform, such as a netrawork station available from SUN Microsystems.

Network monitoring server 104 may include the same components as the corresponding network monitoring server illustrated in FIG. 1. These components include link utilization application 128, automated signaling link utilization analyzer 130, and user interface 132. A description of these components is provided above with regard to FIG. 1 and is not repeated herein.

In operation, network monitoring shelves 500 copy signaling messages received on the access signaling links. Site collectors 508 receive the signaling message copies and store the signaling messages in databases 122. Link utilization application 124 accesses the messages in databases 122 and displays link utilization data, similar to that illustrated in FIG. 3. The end user, using a user input device, selects some of the link utilization data for which further analysis is desired. Automated signaling link utilization analyzer 130 determines the link utilization data selected by the user, formulates parameters for filtering messages stored in database 122, filters the appropriate messages and displays the messages to the user. The user can then diagnose the cause of signaling link utilization problems.

Thus, as described herein, the present invention includes methods and systems for automated signaling link utilization analysis. Rather than requiring the user to separately analyze link utilization and signaling message data, the present invention automates this process by linking signaling link utilization data with signaling message data in an automated manner. Because this data can be linked and displayed to the user in a convenient format, the time required for diagnosing signaling link utilization problems is reduced.

It will be understood that various details of the invention may be changed without departing from the scope of the invention. Furthermore, the foregoing description is for the purpose of illustration only, and not for the purpose of limitation—the invention being defined by the claims.

What is claimed is:

1. A method for automated analysis of signaling link utilization, the method comprising:
   (a) copying signaling messages from a plurality of different signaling links and storing the signaling messages in a signaling message database;
   (b) generating signaling link utilization data based on the data stored in the database;
   (c) displaying a signaling link utilization screen to a user, the signaling link utilization screen including a graph of signaling link occupancy per unit time for a plurality of different signaling links, the graph including a plurality of portions indicating signaling link occupancies at different times;
   (d) receiving input from the user via the signaling link utilization screen for selecting one of the portions, wherein the selected portion corresponds to signaling link occupancy for a specific time period for one of the signaling links;
   (e) automatically extracting, from the signaling message database, signaling message data corresponding to the selected portion, the signaling message data including signaling message types for signaling messages corresponding to the selected portion of the graph; and
   (f) displaying the signaling message data to the user via a computer display device.

2. The method of claim 1 wherein copying signaling messages includes copying SS7 signaling messages.

3. The method of claim 1 wherein copying signaling messages includes copying IP telephony signaling messages.

4. The method of claim 1 wherein generating signaling link utilization data includes generating data indicative of signaling messages that traverse the signaling links in a predetermined time period.

5. The method of claim 1 wherein displaying the signaling link utilization data to the user includes displaying the signaling link utilization data to the user in tabular format.

6. The method of claim 1 wherein receiving input from the user regarding a portion of the link utilization data that the user desires to analyze includes receiving coordinates on a signaling link utilization graph selected by the user and determining signaling link utilization data corresponding to the selected coordinates.

7. The method of claim 1 wherein automatically extracting the signaling message data includes automatically launching a protocol analysis application from the signaling link utilization screen in response to the input from the user.

8. The method of claim 1 wherein displaying the signaling message data to the user via a computer display device includes displaying copies of signaling messages corresponding to the link utilization data to the user.

9. The method of claim 1 wherein displaying the signaling message data to the user via a computer display device includes displaying predetermined fields from signaling message data corresponding to the selected link utilization data to the user.

10. The method of claim 1 wherein the selected link utilization data and the corresponding signaling message data consist of data for a single signaling link.

11. A system for automated analysis of signaling link utilization, the system comprising:
   (a) a message copy function for copying signaling messages from a plurality of different signaling links;
   (b) a link utilization application operatively associated with the message copy function for generating link utilization data based on the copied signaling messages and for displaying the link utilization data to the user via a link utilization screen, the displayed link utilization data including a graph of signaling link occupancy per unit time for at least one signaling link, the graph including a plurality of portions indicating signaling link occupancies at different times; and
   (c) an automated link utilization analyzer operatively associated with the link utilization application for receiving input from the user via the link utilization screen for selecting one of the portions, wherein the selected portion corresponds to signaling link occupancy for a specific time period for one of the signaling links, and for, in response to the input from the user, automatically extracting corresponding signaling message information from a database and displaying the extracted signaling message information to the user, the displayed signaling message information including signaling message types for signaling messages corresponding to the selected portion of the graph.

12. The system of claim 11 wherein the message copy function is internal to a signaling message routing node.

13. The system of claim 11 wherein the message copy function is located on a stand-alone network monitoring platform.

14. The system of claim 11 wherein the link utilization application is adapted to count the number of signaling messages traversing each of the signaling links in a predetermined time period.

15. The system of claim 11 wherein the link utilization application is adapted to display the link utilization data to the user in tabular format.

16. The system of claim 11 wherein the automated link utilization analyzer is adapted to extract signaling message copies from the database and display the signaling message copies to the user.

17. The system of claim 11 wherein the automated link utilization analyzer is adapted to display selected fields from copied signaling messages to the user.

18. The system of claim 11 wherein the automated signaling link analyzer is adapted to automatically launch, from the link utilization screen, a protocol analysis application for extracting the signaling message information.

19. The system of claim 11 wherein the selected link utilization data and the corresponding signaling message data consist of data regarding a single signaling link.

20. A computer program product for automated analysis of signaling link utilization, the computer program product comprising computer-executable instructions, stored in a computer-readable medium, which when executed by a processor of a computer perform steps comprising:
   (a) displaying signaling link utilization data regarding utilization of a plurality of different signaling links to a user via a link utilization screen, the signaling link utilization screen including a graph of signaling link occupancy per unit time for a plurality of different signaling links, the graph including a plurality of portions indicating signaling link occupancies at different times;
   (b) receiving input from the user via the signaling link utilization screen for selecting one of the portions, wherein the selected portion corresponds to signaling link occupancy for a specific time period for one of the signaling links;
   (c) automatically extracting, from the signaling message database, signaling message data corresponding to the selected portion, the signaling message data including signaling message types for signaling messages corresponding to the selected portion of the graph; and (d) displaying the extracted signaling message data to the user via a computer display device.

21. The computer program product of claim 20 wherein displaying signaling link utilization data includes displaying data indicative of signaling messages that traverse the signaling link in a predetermined time period.

22. The computer program product of claim 20 wherein displaying the signaling link utilization data to the user includes displaying the signaling link utilization data to the user in tabular format.

23. The computer program product of claim 20 wherein receiving input from the user regarding a portion of the link utilization data that the user desires to analyze includes receiving a point on a signaling link utilization graph selected by the user and determining signaling link utilization data closest to the point.

24. The computer program product of claim 20 wherein automatically extracting the signaling message data includes automatically launching a protocol analysis application from the signaling link utilization screen in response to receiving the input from the user.

25. The computer program product of claim 20 wherein displaying the signaling message data to the user via computer display device includes displaying copies of signaling messages corresponding to the link utilization data to the user.

26. The computer program product of claim 20 wherein displaying the signaling message data to the user via the computer display device includes displaying selected fields from the signaling message data to the user.

* * * * *